July 2, 1929.  J. S. WEIGHTMAN  1,719,348
MEASURING TAP
Filed Feb. 8, 1923
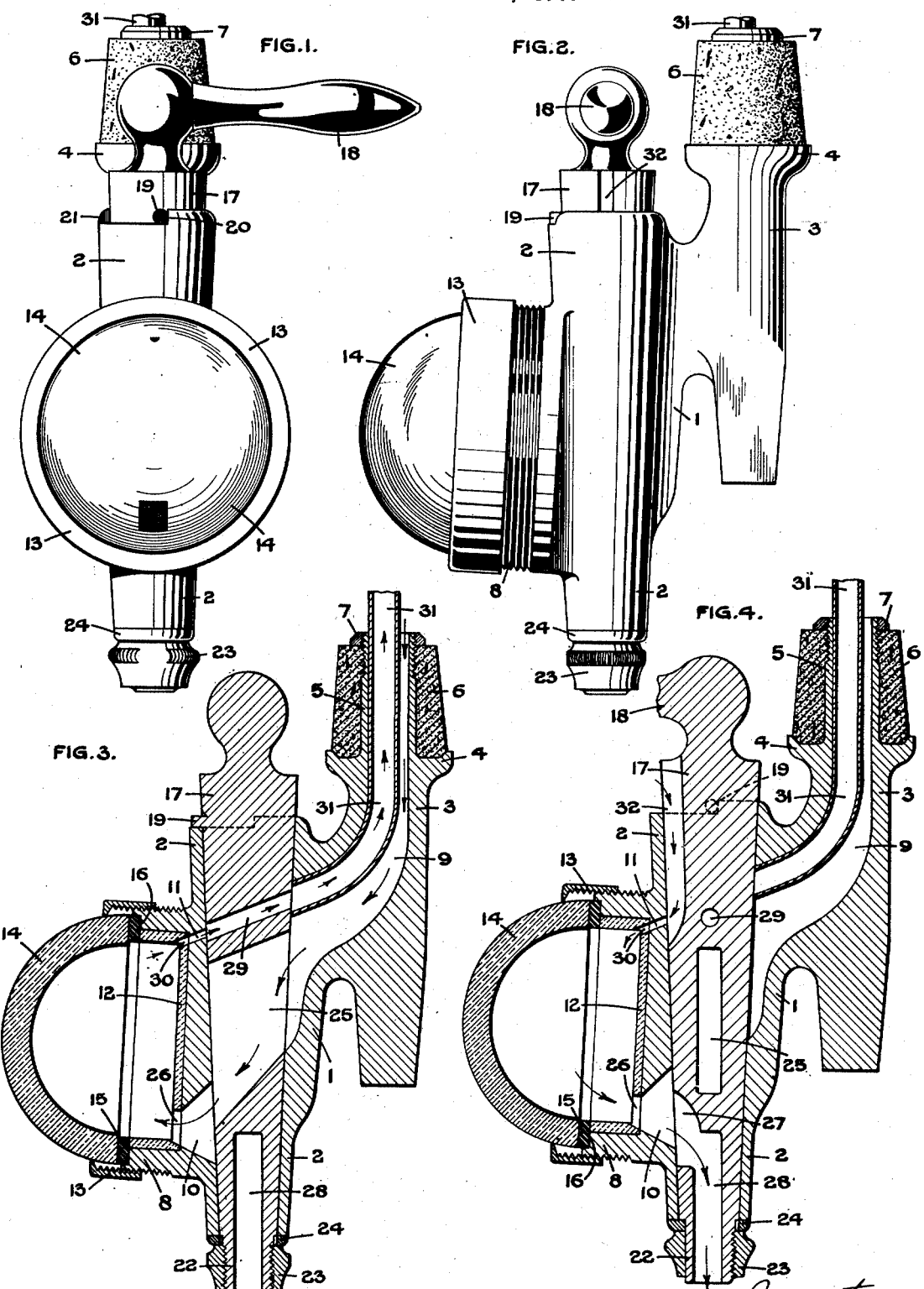

Patented July 2, 1929.

1,719,348

UNITED STATES PATENT OFFICE.

JOHN SINCLAIR WEIGHTMAN, OF BIRMINGHAM, ENGLAND, ASSIGNOR TO GASKELL & CHAMBERS LIMITED, OF BIRMINGHAM, ENGLAND, A COMPANY OF GREAT BRITAIN.

MEASURING TAP.

Application filed February 8, 1928, Serial No. 252,905, and in Great Britain July 12, 1927.

This invention relates to measuring taps of the kind comprising a hollow casing containing a movable valve controlling the passage of the liquid to a measuring chamber from an inlet passage and from the measuring chamber to a discharge passage.

In such measuring taps as at present generally constructed the measuring chamber is provided with two ports, i. e. an upper port which serves to permit the liquid to enter the measuring chamber and a lower port for the purpose of allowing the liquid to leave the measuring chamber.

Our invention is particularly applicable to that kind of measuring tap wherein the flow of liquid is controlled by means of a plug valve arranged substantially vertically, the valve being mounted for turning movement on its own axis and operating in a tubular part of the casing, the inlet passage to the casing being situated at the upper part thereof and the measuring chamber being situated on the front of the tubular part of the casing.

Such a tap is described in specification No. 21,754 of 1911 and in this construction the front of the measuring chamber is provided with a transparent panel so that the filling and emptying of the measuring chamber is visible.

In measuring taps of the kind wherein the liquid can be seen in the measuring chamber through a transparent panel the inlet and discharge ports of the measuring chamber are visible through the transparent panel and appear as black cavities and are actually magnified if the transparent panel is of dome like formation so that as viewed from the front the measuring chamber is unsightly.

It is an object of the present invention to provide an improved measuring tap which will be more hygienic and less unsightly than those at present generally in use.

One of the features of the present invention is to employ the same port (or ports) for the inlet of liquid to the measuring chamber and for the discharge of the liquid from the measuring chamber.

In order that the measuring chamber may empty itself completely the said port (or ports) is situated at the lowest part of the measuring chamber.

A further feature of the present invention is to form or provide the interior of the measuring chamber with a cup like or other liner of hygienic and non-corrosive material such as earthenware or stainless steel. Thus by using the same port in the measuring chamber both for inlet and outlet purposes the number of openings in the back of the measuring chamber and in the cup, if used, is reduced and its appearance from the front of the tap consequently improved.

The liner or cup which may be provided in the measuring chamber may either be fixed in position or it may be removable if desired.

In order that a single port in the lower part of the back of the measuring chamber may be used both for inlet and discharge purposes, the ports in the valve controlling the flow of liquid to and from the measuring chamber are formed so that they overlap in a longitudinal direction, i. e. one end of the inlet port of the valve is on the same level as the entrance end of the discharge port in the valve.

Referring to the drawings:—

Figure 1 is a view in front elevation.

Figure 2 is a view in side elevation.

Figure 3 is a sectional view in side elevation.

Figure 4 is a sectional view in side elevation showing the valve in its alternative position.

In the construction illustrated the apparatus comprises a valve casing 1 having a tubular portion 2 which serves as a valve seat.

The casing 1 is further provided with a tubular stem 3 having a shoulder 4 and a hollow shank 5. The shank 5 receives a cork or other member 6 of soft material which is retained in position by a nut 7 the arrangement being such that the member 6 can be thrust into the neck of an inverted bottle.

The casing is further formed with a measuring chamber portion 8.

Passing through the parts 5 and 3 is an inlet passage 9 and in the back of the measuring chamber portion is a port 10 the upper and lower walls of which are inclined to the horizontal so that the back of the port is deeper than the front enabling it to co-operate with two ports in the valve.

Near the top of the chamber portion of the casing is a small vent port 11.

The measuring chamber is provided with a cup shaped liner 12 of porcelain or stainless steel or other non-corrosive and hygienic material.

This measuring chamber may be retained in position by means of a nut 13 screwing on to the exterior of the part 8 of the casing the nut also clamping in position a glass dome shaped panel 14. A washer 15 of rubber or other soft material is placed between the edge of the glass dome 14 and a shoulder 16 formed in the portion 8 of the casing. The washer also engages the front edge of the detachable liner 12.

The valve 17 is of tapering plug form and fits in the part 2 of the casing.

The valve is provided with an operating handle 18 and with a stop pin 19 co-operating with the shoulders 20 and 21 on the part 2 of the casing so that the rotary movement of the valve about its own axis is limited to a right angle.

The lower end of the valve is provided with a stem 22 upon which is a nut 23 engaging a washer 24 abutting against the end of the tubular part 2 of the casing.

The valve is provided with a main port 25 by which the liquid can flow from the inlet passage 9 through the port 10 and through an opening 26 in the liner of the measuring chamber.

The valve is also provided with a discharge port 27 the entrance end of which overlaps in a longitudinal direction the end of the port 25.

The port 27 leads into a discharge passage 28 formed in the lower end of the valve.

The valve is further provided with a vent passage 29 by which air passing through an opening 30 in the liner 12 and through the port 11 may escape through a tube 31 to the vessel from which the liquid is being received, this escape of air taking place when the measuring chamber is filling through the port 10.

The valve is further provided with a vent channel 32 by which air is permitted to pass through the parts 11 and 30 to the upper part of the measuring chamber when the liquid is passing out to the discharge passage 28.

It will be seen that when the valve is in the position shown in Figure 3 the measuring chamber is filling from the bottom and air is escaping from the top of the measuring chamber to the tube 31. When the valve is in the position shown in Figure 4, however, the liquid is passing out through the openings 26, 10 and 27 to the discharge passage 28 while air is entering at the top of the measuring chamber from the passages 32, 11 and 30.

Although we have illustrated our invention as applied to a measuring tap in which a plug valve is used to control the passage of fluid it is equally applicable to measuring taps wherein the measuring chamber is formed inside a hollow valve.

Further, instead of the inlet of liquid taking place through a stem such as 3 it may take place through the upper end of the valve which in such a case would be made hollow for the purpose.

Instead of the discharge taking place through the hollow lower end of the valve the liquid when discharged may pass through a transverse port in the valve to a discharge opening in the casing.

What I claim then is:—

1. A measuring tap comprising a casing having a measuring chamber, a valve seat, and a valve in said valve seat, said valve having inlet and discharge ports, said casing having a port connecting the valve seat with the measuring chamber, the inlet and discharge ports of the valve co-operating alternately with the port in the casing.

2. A measuring tap comprising a casing having a tubular portion forming a valve seat, a hollow front portion forming a measuring chamber, the lowest part of said measuring chamber having a port connecting with the valve seat, and a movable valve in said seat, said valve having separate inlet and discharge ports, which co-operate alternately with the port in the measuring chamber.

3. A measuring tap comprising a casing having a tubular portion forming a valve seat, a hollow front portion forming a measuring chamber, the lowest part of said measuring chamber having a port connecting with the valve seat, and a movable valve in said seat, said valve having separate inlet and discharge ports, which co-operate alternately with the port in the measuring chamber, the ports in the valve having overlapping ends.

4. A measuring tap comprising a casing having a valve seat, a measuring chamber formed in said casing, a separately constructed hygienic and non-corrosive liner in said measuring chamber and a valve in said valve seat, said casing having a port connecting the valve seat with the measuring chamber, said valve having inlet and discharge ports controlling the passage of liquid into and from the measuring chamber, the inlet and discharge ports of the valve cooperating alternately with the port in the casing.

5. A measuring tap comprising a casing having a valve seat, a measuring chamber, formed in said casing a hygienic and non-corrosive liner in said measuring chamber, a transparent front panel for said chamber, a screwed ring retaining said panel and said liner in position and a valve in said valve seat said valve having inlet and discharge ports controlling the passage of liquid into and from the measuring chamber said casing having a port connecting the valve seat with the measuring chamber, the inlet and discharge ports of the valve co-operating alternately with the port in the casing.

6. A measuring tap comprising a casing having a tubular portion forming a valve seat, a hollow front portion forming a measuring chamber, the lowest part of said measuring chamber having a port connecting with the valve seat, said casing having a hollow back portion forming an inlet for liquid and a movable valve in said seat, said valve having separate inlet and discharge ports, which co-operate alternately with the port in the measuring chamber, said valve having two vent passages one of which is formed by a transverse hole and the other of which is formed by a channel in the surface of the valve, said measuring chamber having a single vent port co-operating alternately with the vent passages in the valve.

7. A measuring tap comprising a casing having a measuring chamber, a valve seat, a valve in said valve seat, said valve having inlet and discharge ports, said casing having a port connecting the valve seat with the measuring chamber, said valve having two vent passages, said measuring chamber having a single vent port co-operating alternately with the vent passages in the valve.

In witness whereof I affix my signature.

JOHN SINCLAIR WEIGHTMAN.